Oct. 21, 1930. A. G. BRODBECK ET AL 1,779,030
VEHICLE DIRECTION INDICATOR
Filed Jan. 20, 1930    2 Sheets-Sheet 2
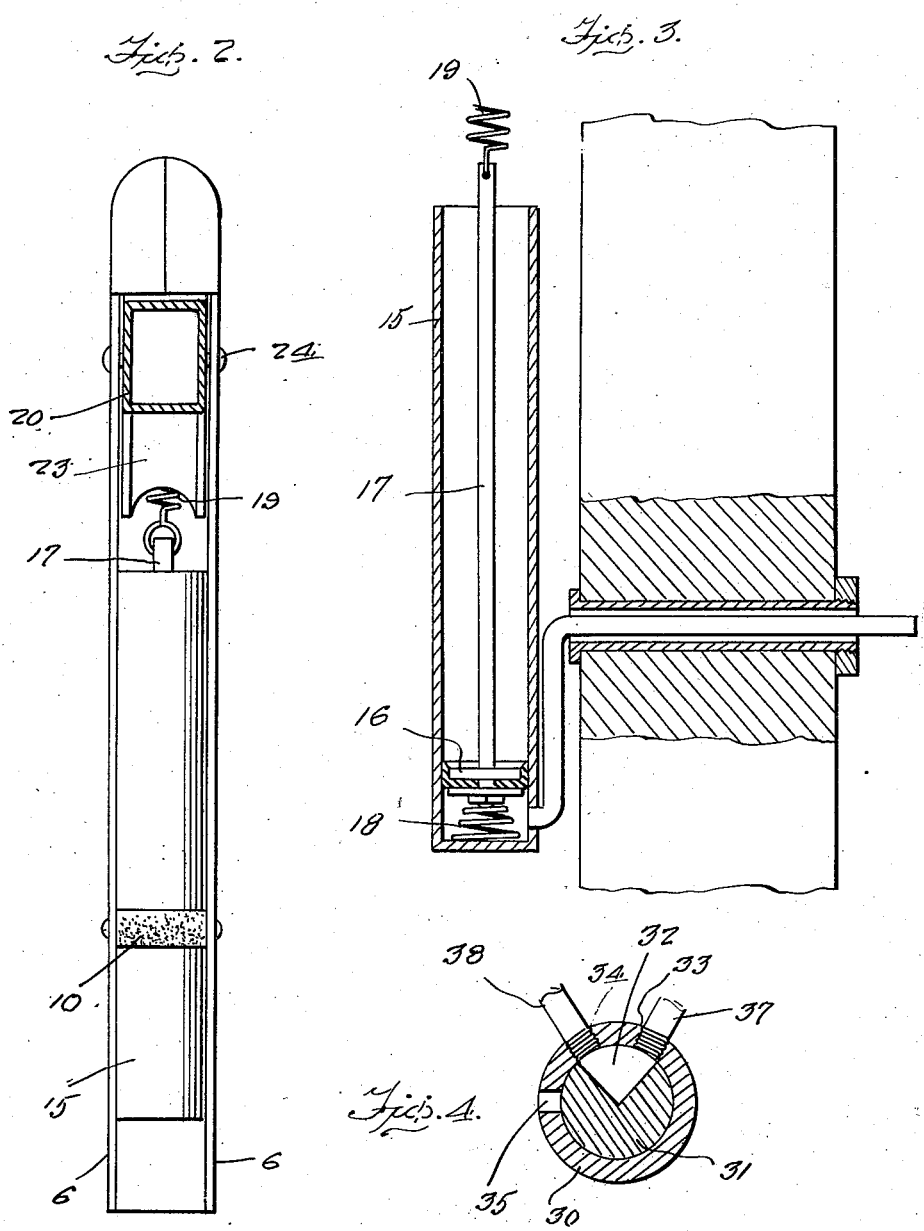
Inventors
A. G. Brodbeck
H. W. Armading
By Clarence A. O'Brien
Attorney Patented Oct. 21, 1930

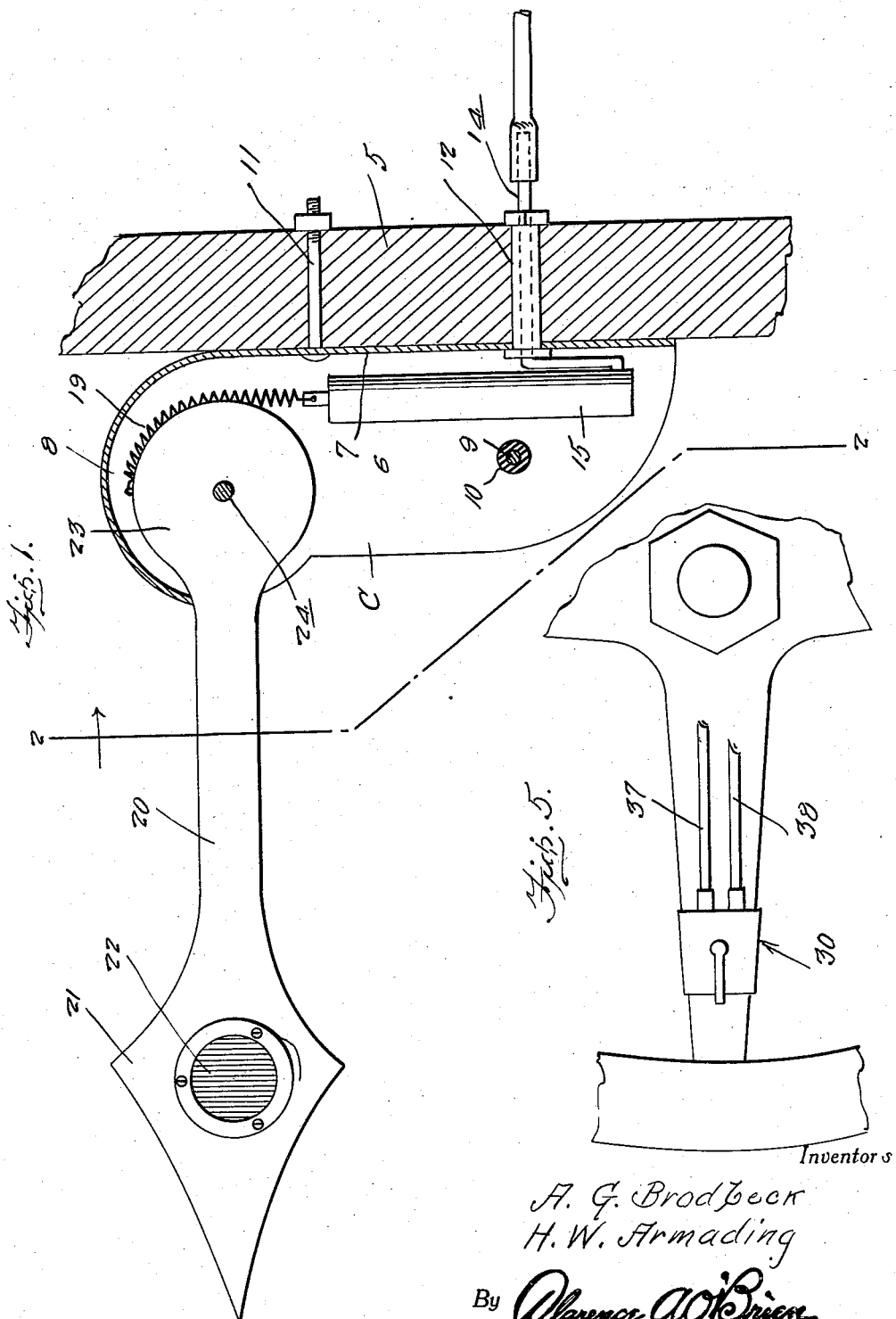

1,779,030

UNITED STATES PATENT OFFICE

ARTHUR G. BRODBECK AND HARRY W. ARMADING, OF SOUTH WALES, NEW YORK

VEHICLE DIRECTION INDICATOR

Application filed January 20, 1930. Serial No. 422,100.

The present invention relates to an improvement in direction indicators for vehicles and more particularly for automobiles, the device being characterized by a signal arm movable in and out of a casing, this movement of the signal arm being controlled by the suction in the intake manifold or the like of the vehicle engine in a novel and simple manner.

The primary object of the present invention resides in the provision of such an indicator or vehicle that may be applied in an expeditious manner to practically all known types of vehicles.

A still further very important object of the invention resides in the provision of a vehicle direction indicator which is exceedingly simple in its construction, inexpensive to manufacture and install, strong and durable, compact and convenient in its arrangement of parts, and thoroughly efficient and reliable in use and operation.

With the above and numerous other objects in view as will appear as the description proceeds, the invention resides in certain novel features of construction, and in the combination and arrangement of parts as will be hereinafter more fully described and claimed.

In the drawing:

Figure 1 is a vertical section through the indicator embodying the features of our invention, Figure 2 is a sectional view taken substantially on the line 2—2 of Figure 1, Figure 3 is a vertical detail section through the cylinder, Figure 4 is a detail sectional view through the valve, and Figure 5 is a plan view of the valve showing the same on one of the spokes of the steering wheel.

Referring to the drawing in detail it will be seen that the numeral 5 denotes a portion of an automobile body or the like. The letter C denotes generally a casing comprising front and rear walls 6 connected along adjacent vertical edges by an inner side wall 7 which merges into a curved top wall 8. A bolt 9 extends between the lower portion of the walls 6 and has a spacing sleeve 10 disposed thereabout.

The wall 7 is bolted to the portion 5 as at 11 or in any other suitable manner attached thereto. A tube 12 extends through the portion 5 to receive a pipe 14, the outer end of which extends downwardly and communicates with the bottom end of a vertical cylinder 15 located in the casing 3.

The bottom of the cylinder is closed as is indicated in Figure 3. A piston 16 is slidable in the casing and has a rod 17 rising therefrom. A spring 18 is mounted in the bottom of the casing and the piston 16 normally rests thereon. An elongated coil spring 19 is connected with the upper end of the rod 17.

An arrow shaped indicator arm 20 has its head 21 provided with a crystal reflector 22. The other end of the arm 20 is circular shaped as is indicated at 23 and said end 23 is rockable on a pin 24 between the upper portions of the walls 6. The elongated coil spring 19 is fixed to a portion of the periphery of the end 23 so that when the suction is on the piston 16 is down against the spring 18 and the spring 17 is pulled to hold the indicator extending outwardly in a horizontal position in abutment with the outer bottom edge of the top wall 8.

The spring 19, of course, takes care of any unnecessary pull occasioned by the downward movement of the piston 16 and also takes care of vibration and the like as a signalling arm.

The valve is preferably mounted on one of the spokes of the steering wheel as is indicated in Figure 5 and comprises a casing 30 with a core 31 therein. The core 31 is provided with a notch 32 which may be brought into registry with openings 33 and 34 or 34 and 35.

The opening 35 is an air intake opening from the atmosphere. A pipe 37 leads from the opening 33 to a suitable source of suction such as the intake manifold. Pipe 38 extending from the opening 34 is suitably coupled with the pipe 14 as is indicated in Figure 1.

It will therefore be seen that when the valve 31 is situated as is shown in Figure 4, the signal is in signalling position but should the valve be turned so as to register the notch 32 with the openings 34 and 35 then the signalling arm will gravitate to depend in a vertical position or non-signalling position abutting the rubber spacing sleeve 10 on the bolt 9 because the weight of the signalling arm will pull the piston up by sucking air in through the opening 35.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A vehicle direction indicator of the class described comprising a casing formed with front and rear spaced parallel coextensive walls connected by an inner side wall merging into a curved top wall, a signalling arm swingably mounted at one end between the upper ends of the front and rear walls, the inner pivoted end of the arm being rounded, an elongated coil spring having one end engaged with the periphery of said rounded end, and means for pulling on the coil spring to cause the swinging of the signalling arm.

2. A vehicle direction indicator of the class described comprising a casing formed with front and rear spaced parallel coextensive walls connected by an inner side wall merging into a curved top wall, a signalling arm swingably mounted at one end between the upper ends of the front and rear walls, the inner pivoted end of the arm being rounded, an elongated coil spring having one end engaged with the periphery of said rounded end, a cylinder, a piston in the cylinder, a rod connected with the piston and extending through one end of the cylinder and connected with the spring, and means for creating a vacuum in the other end of the cylinder for moving the piston and thereby actuating the signalling arm.

3. A vehicle direction indicator of the class described comprising a casing formed with front and rear spaced parallel coextensive walls connected by an inner side wall merging into a curved top wall, a signalling arm swingably mounted at one end between the upper ends of the front and rear walls, the inner pivoted end of the arm being rounded, an elongated coil spring having one end engaged with the periphery of said rounded end, a cylinder, a piston in the cylinder, a rod connected with the piston and extending through one end of the cylinder and connected with the spring, and means for creating a vacuum in the other end of the cylinder for moving the piston and thereby actuating the signalling arm, a bolt between the front and rear walls, and a rubber sleeve on said bolt against which the signalling arm normally rests.

In testimony whereof we affix our signatures.

ARTHUR G. BRODBECK.
HARRY W. ARMADING.